(12) United States Patent
Horie

(10) Patent No.: US 7,899,165 B2
(45) Date of Patent: Mar. 1, 2011

(54) MAINTENANCE INFORMATION COMMUNICATION TERMINAL, IMAGE FORMING APPARATUS PROVIDED WITH SAME, MAINTENANCE INFORMATION MANAGEMENT HOST, AND COMMUNICATION METHOD

(75) Inventor: Nobuyuki Horie, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1414 days.

(21) Appl. No.: 11/357,598

(22) Filed: Feb. 17, 2006

(65) Prior Publication Data
US 2006/0182246 A1 Aug. 17, 2006

(30) Foreign Application Priority Data
Feb. 17, 2005 (JP) .............................. 2005-040566

(51) Int. Cl.
H04M 11/00 (2006.01)
(52) U.S. Cl. .............................. 379/100.01; 358/426.15
(58) Field of Classification Search ............. 379/100.01
See application file for complete search history.

(56) References Cited

U.S. PATENT DOCUMENTS

| | | | | |
|---|---|---|---|---|
| 5,146,489 A | * | 9/1992 | Telibasa ................ | 379/100.01 |
| 5,642,409 A | * | 6/1997 | Kotani et al. ........... | 379/100.15 |
| 5,805,678 A | * | 9/1998 | Okamoto et al. ....... | 379/100.01 |
| 5,894,508 A | * | 4/1999 | Kim ...................... | 379/102.04 |
| 5,920,624 A | * | 7/1999 | Davis .................... | 379/373.01 |
| 6,035,023 A | * | 3/2000 | Monty et al. ........... | 379/100.15 |
| 7,184,537 B2 | * | 2/2007 | McClure et al. ......... | 379/88.13 |

FOREIGN PATENT DOCUMENTS

| | | |
|---|---|---|
| JP | 07-046335 | 2/1995 |
| JP | 09-247330 | 9/1997 |
| JP | 2000-138764 | 5/2000 |
| JP | 2000-224368 | 8/2000 |
| JP | 3129186 | 1/2001 |
| JP | 2003-101745 | 4/2003 |
| JP | 2003-178153 | 6/2003 |

* cited by examiner

*Primary Examiner*—Curtis Kuntz
*Assistant Examiner*—Maria El-Zoobi
(74) *Attorney, Agent, or Firm*—David G. Conlin; Steven M. Jensen; Edwards Angell Palmer & Dodge LLP (57) ABSTRACT

A maintenance information communication terminal, the terminal exchanging maintenance information on an apparatus to be maintenanced with a maintenance information management host, the terminal and the host being connectable together by a line, the apparatus connected to the terminal, the terminal comprising: a host number memory section that stores a telephone number of the host; a terminal call origination section that originates a call to the host of the stored telephone number so that the host recognizes a telephone number of the terminal; and a ringing duration controlling section that controls a ringing duration of the call so as to halt the call before the host connects the line and thereby to request the host to start communication.

5 Claims, 5 Drawing Sheets

MAINTENANCE INFORMATION COMMUNICATION TERMINAL, IMAGE FORMING APPARATUS PROVIDED WITH SAME, MAINTENANCE INFORMATION MANAGEMENT HOST, AND COMMUNICATION METHOD

CROSS-REFERENCE TO RELATED APPLICATION

This application is related to Japanese application No. 2005-040566 filed on Feb. 17, 2005, whose priority is claimed and the disclosure of which is incorporated by reference in its entirety.

BACKGROUND OF THE INVENTION

1. Field of the Invention

The present invention relates to a maintenance information communication terminal and a maintenance information management host for exchanging maintenance information on an apparatus with each other.

2. Description of Related Art

Remote maintenance systems for maintaining and managing image forming apparatuses have been utilized for the purpose of regular readings of counters, checking of consumables and update of firmware in the image forming apparatuses, change in settings of the image forming apparatuses, self-diagnosis of the image forming apparatuses, and grasp of the operating condition of the image forming apparatuses on the occurrence of an abnormality therein. The above systems are such that a host such as a service center and a maintenance information communication terminal are connected together by a dedicated or dialup line for transmission and reception of information or data (maintenance information) on an image forming apparatus such as a copying machine or a multifunction apparatus to which the terminal is connected. There has been a demand for remote maintenance systems that do not burden customers with communication costs or with setups, that is, with installation and occupation of communication lines.

As a system that meets the above demand, there is known one in which, for maintenance of a facsimile for example, a service center originates a call to the facsimile, while the facsimile recognizes a telephone number of the service center, determines that the call is originated from the service center, and shifts to a maintenance mode to connect a line, whereby a charge for the call is saved (e.g., Japanese Patent No. 3129186).

Also known is a system in which a center device originates a call to a facsimile to inform that the center device requests maintenance information of the facsimile, then disconnects a line once, and, after completion of the facsimile's recognition of the request, originates a call again to the facsimile to acquire the requested maintenance information, whereby a connection time wasted for the facsimile' recognition of the request is eliminated so that the telephone bill is reduced (e.g., Japanese Unexamined Patent Publication No. Hei 9(1997)-247330).

When an abnormality occurs in an image forming apparatus, especially when troubles occur a predetermined time in succession, remote maintenance systems such as described above are used to transmit information on the troubles immediately to a service center and thus to a service engineer so that the service engineer can make a visit to maintain and quickly recover the apparatus.

There are two types of methods for informing a service center of a trouble in an image forming apparatus. One is a method in which an image forming apparatus connects a line to a host and the other is a polling-type method in which a host regularly connects a line to an image forming apparatus to grasp the condition of the image forming apparatus.

In the polling-type method, however, since the condition of the image forming apparatus is grasped for every predetermine interval, the host cannot immediately be informed of an abnormality in the image forming apparatus. In the method in which an image forming apparatus connects to a line to a host, on the other hand, though the host can immediately be informed of abnormality, a communication charge is made to a customer even for a call to inform a trouble of less urgency, and also the telephone line to the customer is occupied for communication with a low priority. In an office with a smaller number of telephone lines, there is a fear that all the telephone lines might be occupied with communication of maintenance information to interfere with the work of the customer.

Under these circumstances, there has been a demand for remote maintenance systems that burden a customer little even if there is a need for irregular transmissions of information from an apparatus.

SUMMARY OF THE INVENTION

The present invention provides a remote maintenance system that does not burden a customer with communication costs even if there is a need for transmission of information from a terminal to a host and also that does not use a line in waste if the system judges that the trouble is of less urgency.

In one aspect, the present invention provides a maintenance information communication terminal, the terminal exchanging maintenance information on an apparatus to be maintenanced with a maintenance information management host, the terminal and the host being connectable together by a line, the apparatus connected to the terminal, the terminal comprising:

a host number memory section that stores a telephone number of the host; a terminal call origination section that originates a call to the host of the stored telephone number so that the host recognizes a telephone number of the terminal; and a ringing duration controlling section that controls a ringing duration of the call so as to halt the call before the host connects the line and thereby to request the host to start communication.

In another aspect, the present invention provides a maintenance information management host, the host exchanging maintenance information on an apparatus to be maintenanced with a maintenance information communication terminal, the terminal and the host being connectable together by a line, the apparatus being connected to the terminal, the host comprising: a telephone number recognizing section that recognizes a telephone number of the terminal when a call from the terminal arrives at the host; a host call origination section that originates a call in return to the terminal of the recognized telephone number; and a maintenance information controlling section that exchanges maintenance information after the terminal connects the line when the call in return arrives at the terminal.

In still another aspect, the present invention provides an image forming apparatus, comprising either one of the above maintenance information communication terminals.

In yet another aspect, the present invention provides a method for communicating maintenance information on an apparatus to be maintenanced between a maintenance information communication terminal and a maintenance information management host, the terminal and the host being connectable together by a line, the apparatus being connected to the terminal, the method comprising the step of: originating a call from the terminal to the host by using a telephone number of the host, the telephone number being stored in the terminal; controlling a ringing duration of the call so that the host recognizes a telephone number of their terminal and that the terminal halts the call before the host connects the line; originating a call from the host in return to the terminal of the recognized telephone number; and exchanging maintenance information with the host after the call in return arrives at the terminal and the host connects the line.

DETAILED DESCRIPTION

The present invention provides a maintenance information communication terminal, the terminal exchanging maintenance information on an apparatus to be maintenanced with a maintenance information management host, the terminal and the host being connectable together by a line, the apparatus connected to the terminal, the terminal comprising: a host number memory section that stores a telephone number of the host; a terminal call origination section that originates a call to the host of the stored telephone number so that the host recognizes a telephone number of the terminal; and a ringing duration controlling section that controls a ringing duration of the call so as to halt the call before the host connects the line and thereby to request the host to start communication. The terminal, when transmission of information from the apparatus side to the host is required, originates a call to allow the host to recognize the telephone number of the terminal and then halts the call. Accordingly, the terminal can request the host to start communication at no charge.

Also, the present invention provides a maintenance information management host, the host exchanging maintenance information on an apparatus to be maintenanced with a maintenance information communication terminal, the terminal and the host being connectable together by a line, the apparatus being connected to the terminal, the host comprising: a telephone number recognizing section that recognizes a telephone number of the terminal when a call from the terminal arrives at the host; a host call origination section that originates a call in return to the terminal of the recognized telephone number; and a maintenance information controlling section that exchanges maintenance information after the terminal connects the line when the call in return arrives at the terminal. Owing to the call from the terminal, the host can identify the terminal which has originated the call, and, after the terminal halts the call, originates the call in return to the recognized telephone number to exchange maintenance information. Accordingly, the host can exchange maintenance information with no charge to the terminal, that is, to a customer.

The host can identify a maintenance information communication terminal, which has originated a call, by a telephone number (displayed in a number display) of the terminal which is transmitted simultaneously with a ringing signal of the call. Accordingly, the host (e.g., a service center) can originate a call to the terminal to exchange data. With this constitution, even when transmission of information from the apparatus side to the host is required, the terminal can request the host to start communication with no communication charge to a customer. Through exchange of maintenance information, the host can quickly grasp the condition of the apparatus and take a quick appropriate measure.

Further, the present invention provides an image forming apparatus, comprising either one of the maintenance information communication terminals. The terminal can originate a call to request the host to start communication with no communication charge to the customer, and the host can originate a call in return to the terminal and grasp the condition of the apparatus and take a quick appropriate measure.

The image forming apparatus is an apparatus that inputs and/or outputs an image. The image forming apparatus may be, for example, a copying machine, a facsimile, a printer, an image scanner or the like, but is not limited thereto. Maintenance information is information on management and maintenance of the image forming apparatus, and may be information on various counter values used for managing billings and timings when consumables need replacing, information on the conditions of consumables such as the remaining quantity of toner, information on update of firmware, information on the contents of firmware as an object to be updated which is to be downloaded from the host into the image forming apparatus, information on set values in the image forming apparatus, information on an instruction to execute self-diagnosis, information on the condition of the image forming apparatus detected by self-diagnosis, or the like.

The term "line" means any that connects terminals together and with which an exchange carrier offers communication services with charges. Thus, the term "line" is not limited to a wired telephone line but may be a line using a wireless communication system such as in a mobile telephone or may be a line at least partially using the Internet. The term "line", however, is such that a charge is made to a calling party and a telephone number of the calling party is recognized by a called party when a call from the calling party arrives at the called party. The term "telephone number" means an identifying code assigned to each terminal by the exchange carrier.

Connecting a line means bringing the terminal and the host into communication with each other. The period from connection of a line to disconnection thereof is a period to be billed. In contrast, originating a call means a transmission side terminal requesting a reception side terminal to connect a line and thereby to start ringing. The period of ringing is a period not to be billed.

The ringing duration may be controlled based on kind of maintenance information to be transmitted to the host. With this constitution, by measuring the ringing duration, the host is allowed to judge kind of maintenance information with no communication charge to the customer and then to determine specifics of subsequent exchange. Accordingly, the terminal can eliminate unnecessary communication according to circumstances and thus make a customer's line occupied for a reduced period.

Also, the ringing duration may be represented in terms of time and controlled based on kind of maintenance information to be transmitted to the host. With this constitution, the ringing duration can be controlled by a timer means so that highly accurate control can be realized at low costs.

Or, the ringing duration may be represented in terms of the number of rings and controlled based on kind of maintenance information to be transmitted to the host. With this constitution, the ringing duration can be measured by counting the number of rings so that highly accurate control can be realized at low costs by providing a counter means.

Also, the terminal may further comprise a terminal line controlling section that, when a call arrives at the terminal, judges whether or not a telephone number of a station which has originated the call is that of the host and, if the telephone number of the station is that of the host, connects the line. This constitution is preferable in terms of security since the terminal meets no request of a station other than the host for connection of the line, so that there is no fear of leakage of information on the image forming apparatus to such a station.

The host can be constituted of, for example, a general-purpose computer, a line to be connected to the computer, an interface thereto, and a control program for operating the computer as the maintenance information management host.

The host may further comprise a customer information memory section that stores information on a customer, the customer corresponding to the telephone number of the terminal, the maintenance information controlling section determining maintenance information to be transmitted to the terminal based on the information on the customer. With this constitution, the host can obtain the information on the customer based on the recognized telephone number, to exchange maintenance information suitable for the customer.

For example, information on a customer is stored as information on a user such as a copying center whose urgency level is higher than other customers. Then, as a response to a call having been originated from an image forming apparatus corresponding to the customer, the host transmits a message informing that a service engineer will be dispatched urgently so that the message is displayed in a display section of the image forming apparatus. Thus, the host can provide a maintenance service suitable for the customer.

The host may further comprise a history memory section that stores a maintenance history of the apparatus, the apparatus corresponding to the telephone number of the terminal, the maintenance information controlling section determining maintenance information to be transmitted to the terminal based on the maintenance history of the apparatus. With this constitution, the host can determine information to be exchanged, based on the maintenance history. Thus, the host can provide a maintenance service optimum for the apparatus, while making the customer's line occupied for a reduced period.

For example, if the host has already obtained information on counter values and on the conditions of consumables in an apparatus one hour before arrival of a call from the terminal, the host needs to request not all information on the condition of the apparatus but only information not included in a maintenance history of the apparatus so that the time required for communication can be shortened. For an apparatus with a maintenance history revealing a specific use condition such that frequent use of heavy paper, the host can request and analyze maintenance information which is highly related to the specific use condition by priority. For an apparatus in which a similar trouble has occurred in the past, the host can retrieve information from the maintenance history corresponding to the apparatus, analyze the information and request the terminal to transmit more detailed information.

The host may further comprise a ringing duration measuring section that measures a ringing duration of the call from the terminal when the call arrives at the host, the ring duration being controlled by the terminal based on kind of maintenance information to be transmitted to the host, the maintenance information controlling section determining the contents of maintenance information to be transmitted to the terminal based on the measured ringing duration. With this constitution, the host can judge, based on the measured ringing duration of the call from the terminal, kind of information transmitted from the terminal, and determine the contents of maintenance information to be exchanged. Accordingly, the host can provide a maintenance service suitable for the condition of the apparatus.

The kind of information may be kind in classification based on, for example, importance or urgency level of information. For example, the ringing duration may be controlled depending on the severity of a trouble in the apparatus. Based on the ringing duration, the host judges the trouble to be in need of urgent dispatch of a service engineer, to be of a medium priority, or to be of a lower priority and capable of temporarily be solved by suspension of operation of a part of an optional device, and transmits information according to the results of judgment.

By doing this, the host can provide a maintenance service suitable for the condition of the apparatus. In the case of a trouble requiring a relatively less urgent measure, the host can avoid heavy traffic hours for exchange of detailed information, or omit exchange of detailed information to avoid redundant communication and thereby to make the customer's line occupied for a reduced period.

Hereafter, the present invention will be explained in further detail referring to the drawings.

Figure 2:
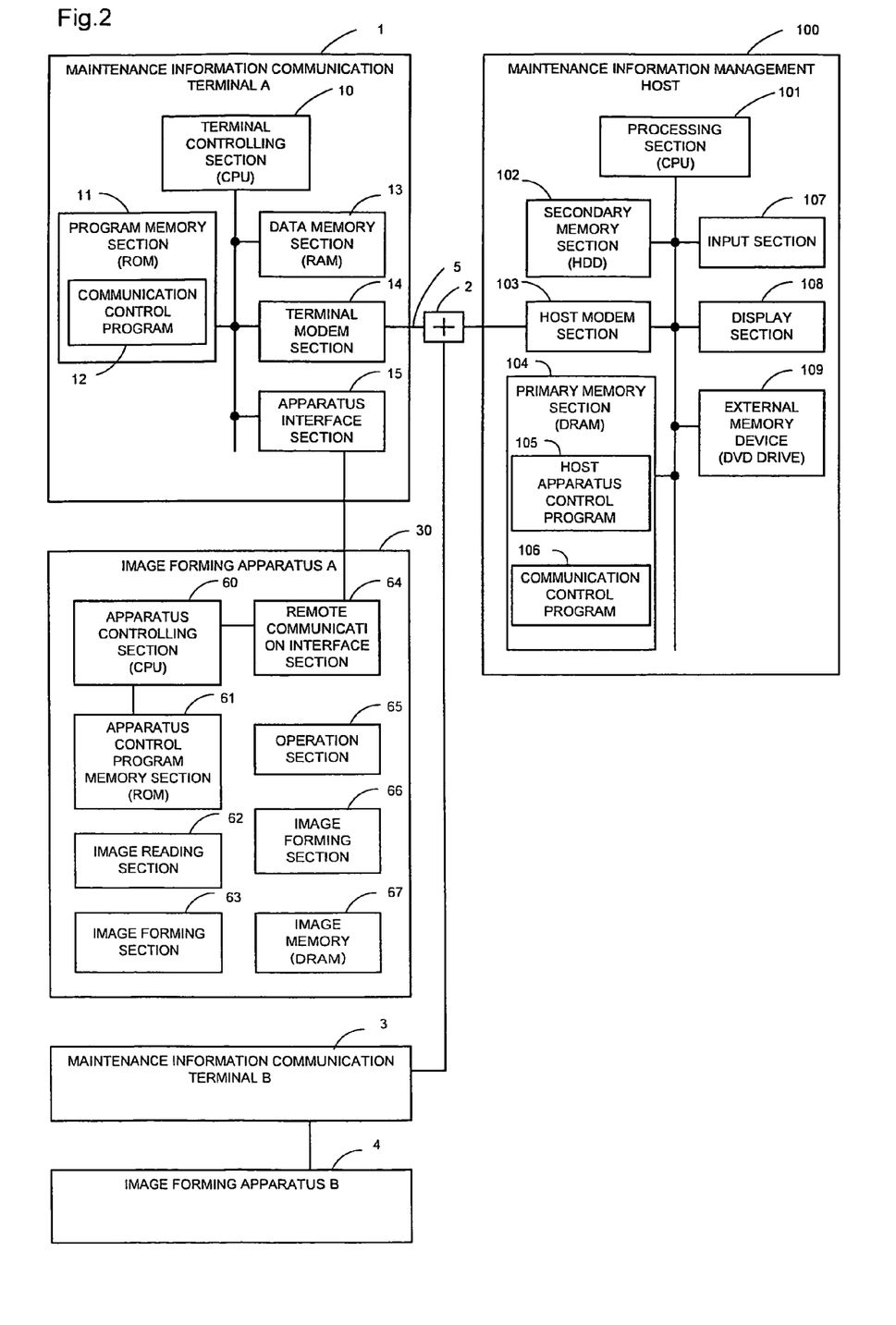
FIG. 2 is a block diagram showing an example of a constitution of hardware of the terminal and of the host according to the present invention.

FIG. 2 is a block diagram showing an example of a constitution of hardware of a maintenance information communication terminal and of a maintenance information management host according to the present invention. In FIG. 2, the maintenance information communication terminal (hereafter, referred to as terminal) 1 comprises an apparatus interface section 15. The apparatus interface section 15 is adapted to be connected to a remote communication interface section 64 of an image forming apparatus 30, which is an apparatus to receive maintenance. The terminal 1 exchanges maintenance information with an apparatus controlling section (CPU) 60 of the image forming apparatus 30.

A terminal modem section 14 is adapted to be connected to a dialup line 5 so that the terminal 1 exchanges maintenance information with a maintenance information management host (hereafter, referred to as host) 100 via a telephone exchange 2. Other terminals such as a maintenance information communication terminal 3 are also adapted to be connected to the dialup line 5 and thereby to exchange maintenance information with the host 100.

The terminal 1 comprises a terminal controlling section (CPU) 10 that controls communication of maintenance information; a program memory section (ROM) 11 that stores a communication control program 12 which is a program for providing operational procedures to be executed by the terminal controlling section 10; and a data memory section (RAM) 13 that stores work data and backup data. At least a data backup area of the data memory section (RAM) 13 is constituted of a nonvolatile memory such as an EEPROM.

The data backup area, however, may be constituted of, for example, a battery and a SRAM.

The image forming apparatus 30 comprises an apparatus control program memory section (ROM) 61 that stores an apparatus control program to be executed by the apparatus controlling section (CPU) 60; an image reading section 62 that reads an image and converts it into an image data; an image processing section 63 that processes the image data; the remote communication interface section 64 that allows information to be exchanged with the terminal 1; an operation section 65 that allows a user to check condition of the image forming apparatus 30 and to provide an operation instruction to the image forming apparatus 30, an image memory (DRAM) 67 that stores the image data processed by the image processing section 63; and an image forming section 66 that outputs as an image the processed image data or the image data stored in the image memory onto a sheet.

The host 100, on the other hand, comprises a processing section (CPU) 101 that controls communication of maintenance information; a primary memory section (DRAM) 104; a secondary memory section (HDD) 102; a host modem section 103; an input section 107; a display section 108; and an external memory device 109. Into the primary memory section 104, there are loaded a communication control program 106 to be executed by the processing section 101, and a host apparatus control program 105 to be used for controlling the host 100, before these programs are executed. The primary memory section 104 has a work memory area. The secondary memory section 102 stores the host apparatus control program 105 and the communication control program 106, which are loaded into the primary memory section 104 when the power is switched on, a customer database and the like. The host modem section 103 is adapted to be connected to the dialup line 5 to exchange maintenance information with the terminal 1 via the telephone exchange 2.

The input section 107 is a section that inputs data or an instruction into the host 100, and comprises a mouse and a keyboard. The display section 108 is a section that displays the processing of the host 100. The external memory device 109 is constituted of a DVD drive for downloading a program or data to the host 100 or for backing up or copying data of the host 100.

In FIG. 2, the terminal controlling section 10 of the terminal 1 and the apparatus controlling section 60 of the image forming apparatus 30 include different CPUs. The terminal controlling section 10 and apparatus controlling section 60, however, may share the same CPU. In such a case, the apparatus interface section 15 and the remote communication interface section 64 are omitted, and the communication control program 12 and the apparatus control program memory section 61 are controlled by the same CPU, and thus are stored in the same ROM.

Figure 3:
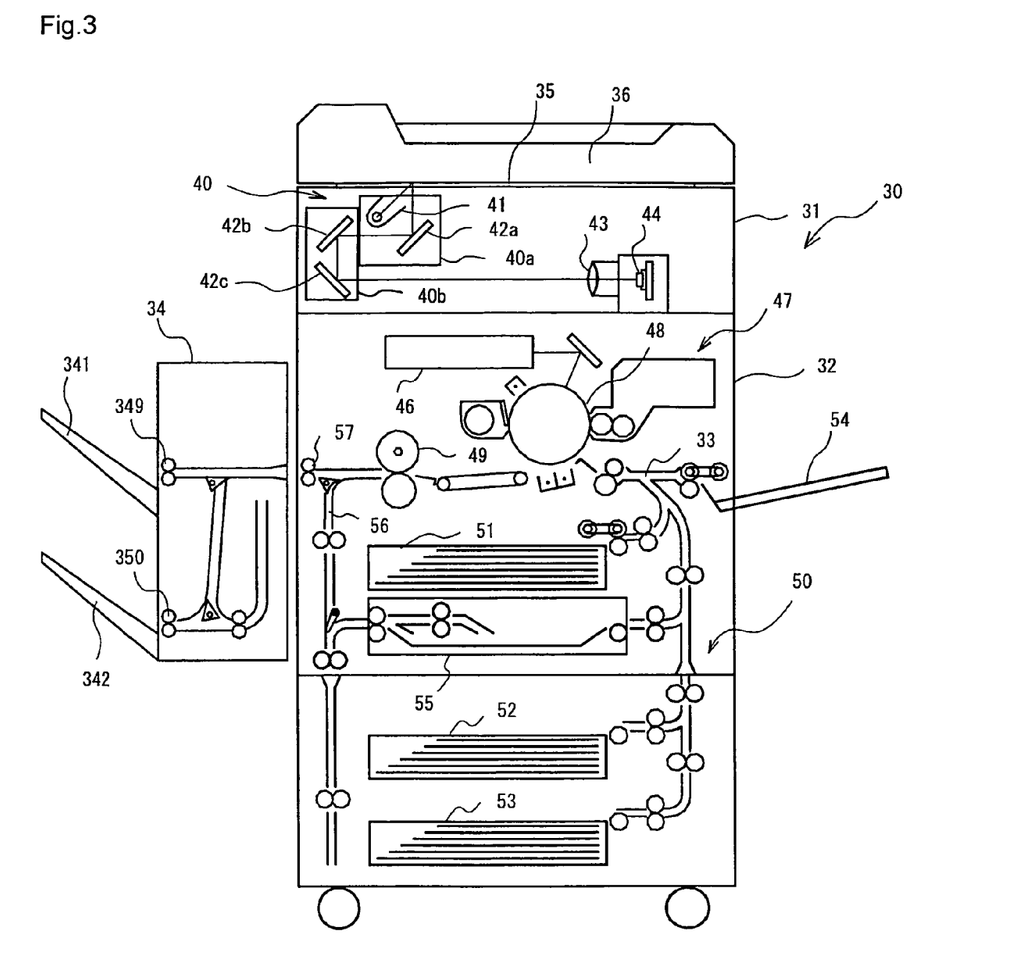
FIG. 3 is a schematic cross sectional view of a digital copying machine 30 taken as an example of an image forming apparatus according to the present invention.

FIG. 3 is a schematic cross sectional view of a digital copying machine taken as an example of the image forming apparatus 30 according to the present invention. The digital copying machine has a main body roughly composed of a scanner section 31, which is equivalent to the image reading section 62 of FIG. 2, and a laser printer section 32, which is equivalent to the image processing section 63 of FIG. 2.

The scanner section 31 includes a platen glass 35 made of a transparent glass, a reversible automatic document feeder (RADF) 36 that automatically feeds and supplies a sheet onto the platen glass 35 from a multi-sheet document, and a scanner unit 40 that scans and reads an image of the document placed on the platen glass 35.

The image of the sheet scanned by the scanner section 31 is transmitted to an image data processing section 63 as image data, and the image data is processed with a predetermined image processing procedure.

The RADF 36 is a device that automatically feeds sheets of the document one sheet at a time to the platen glass 35 of the scanner unit from a document tray, not illustrated, in which the sheets have been set all at once. The RADF 36 includes a single-sided document feeding route and a double-sided document feeding route adapted so that the scanner unit can read one side or both sides of the document according to an operator's choice; a transfer route switching means; a group of sensors adapted to grasp the state of the document and to manage the document when the document passes through each section; a controlling section; and the like. Further explanations on the RADF 36 will be omitted since many applications have been filed in connection with RADFs and the RADFs are in actual use.

The scanner unit 40 includes a first scanning unit 40a, a second scanning unit 40b, an optical lens 43 and a CCD device 44.

The first scanning unit 40a has a lamp reflector assembly 41 that irradiates a surface of the document with light and a first reflecting mirror 42a that reflects the light reflected from the surface of the document, to a second reflecting mirror 42b.

The second scanning unit 40b has the second reflecting mirror 42b and a third reflecting mirror 42c that direct the light reflected from the first scanning unit 40a, to the CCD device, which is a photoelectric conversion device. The optical lens 43 focuses the light reflected from the document and reflected by the above mirrors into an image on a light-receiving surface of the CCD device 44.

The scanner section 31 is adapted so that the image of the document is read by linked operations of the RADF 36 and the scanner unit 40. That is, the sheets of the document to be read are sequentially placed on the platen glass 35 while the scanner unit 40 is moved along a lower surface of the platen glass 35.

The first scanning unit 40a is driven along the platen glass 35 from the left to the right at a fixed velocity of V, while the second scanning unit 40b is driven parallel to the first scanning unit 40a in the same direction at a velocity of V/2.

The image of the document placed on the platen glass 35 is focused on the CCD 44 and is scanned line by line with the CCD 44 to obtain an image data.

The image data thus obtained is transmitted to the image processing section 63 of FIG. 2, where the image data is processed. After that, the image data is once stored in the image memory 67 of FIG. 2, then read out from the image memory 67 according to an output instruction and transmitted to the laser printer section 32, which is equivalent to the image forming section 66 of FIG. 2, where an image is formed on a recording sheet.

The laser printer section 32 includes a sheet feeding device that feeds a sheet on which an image is to be formed; a laser writing unit 46; and an electrophotographic processing section that forms an image.

The laser writing unit 46 has a semiconductor laser light source, a polygon mirror, a f-θ lens and the like. The semiconductor laser light source emits a laser beam based on the scanned image data read by the scanner unit 40 and then read out from the memory 67 or based on an image data transmitted from an external apparatus. The polygon mirror deflects the laser beam at a constant angular velocity so that a surface of a photoconductor drum 48, which is a constituent element of the electrophotographic processing section, is scanned with the laser beam at a constant liner velocity.

The electrophotographic processing section includes a charger, a developing device 47, a transferring device, a sheet detaching device, a cleaner and a discharging device, all of which are provided around the photoconductor drum 48.

The sheet feeding device, on the other hand, includes a sheet feeding section 33 that feeds a sheet P to a transfer position, at which position the transferring device is disposed; cassette sheet feeders 51, 52 and 53 that feed the sheet P to the sheet feeding section 33; a manual sheet feeder 54 that properly feeds a sheet of a desired size; a fixing device 49 that fixes an toner image on a surface of the sheet P after the transferring; and a duplex unit 55 that refeeds the sheet P after the fixing, to form another image on the opposite surface of the sheet P.

Disposed downstream of the fixing device 49 is a finishing device 34 that receives the sheet P having the images and subjects the sheet P to a predetermined processing.

By scanning of a laser beam from the laser writing unit 46, the image data read out from the image memory 67 of FIG. 2 is converted into an electrostatic latent image on the surface of the photoconductor drum 48. The electrostatic latent image is visualized with a toner supplied from the developing device 47 into a toner image. The toner image is statically transferred onto a surface of a sheet fed from one of the sheet feeders of a multi sheet feeder unit, and is fixed thereon.

The sheet having image(s) thus formed thereon is transferred via the fixing device 49 and further via a sheet exit roller 57 into the finishing device 34.

Figure 4:
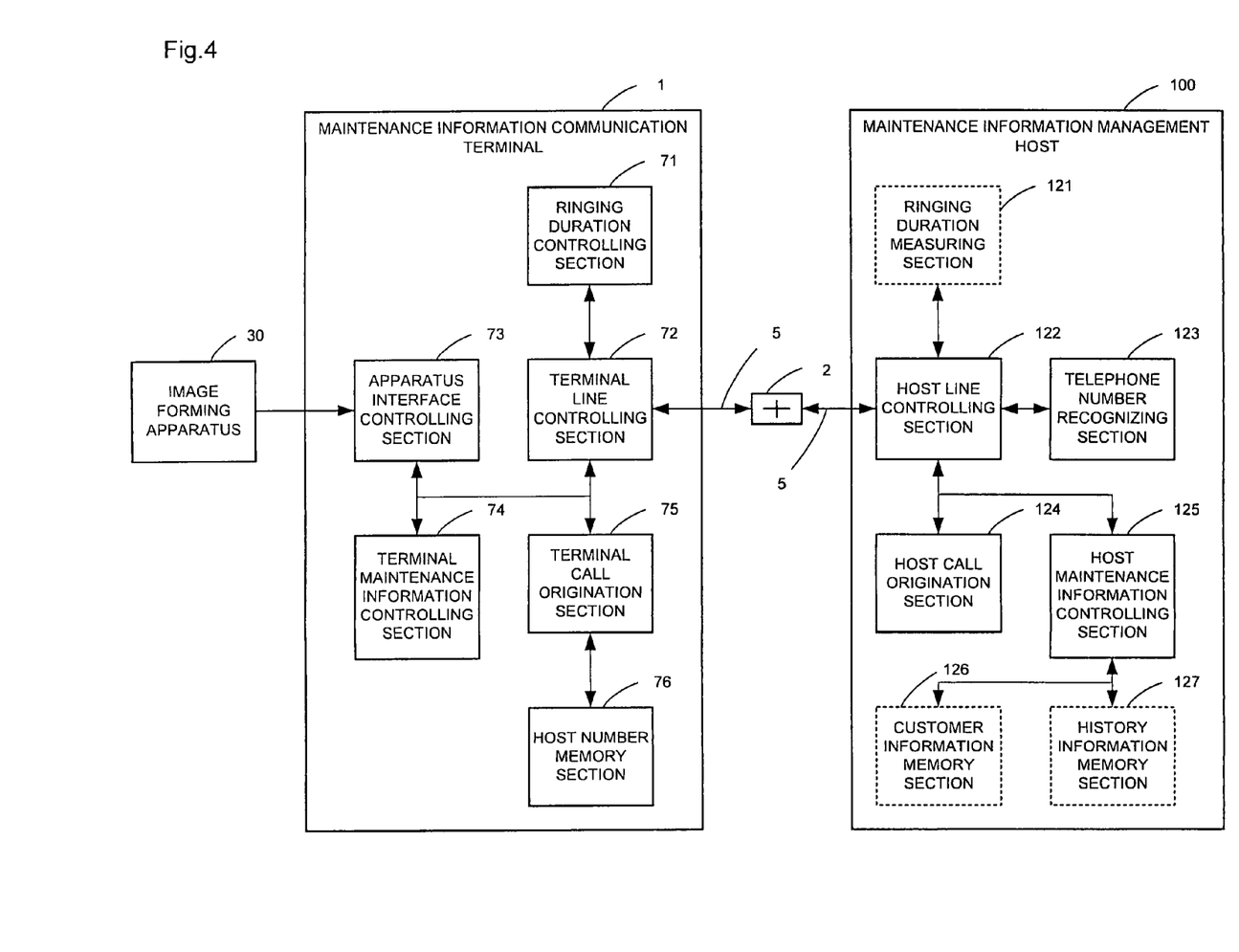
FIG. 4 is a schematic block diagram showing functional constitutions of the terminal 1 and the host 100 of FIG. 2, respectively.

FIG. 4 is a schematic block diagram showing functional constitutions of the terminal 1 and the host 100 of FIG. 2, respectively. In FIG. 4, an apparatus interface controlling section 73 is a block that controls the apparatus interface section 15 of FIG. 2 so that the terminal 1 exchanges maintenance information with the image forming apparatus 30. Exchange of maintenance information with the host 100 is controlled by a terminal maintenance information controlling section 74.

A terminal line controlling section 72 is a block that controls the terminal modem section 14 of FIG. 2 so that the terminal 1 communicates maintenance information with the host 100 via the dialup line 5. A host number memory section 76 is a memory section that stores a telephone number of the host 100, and is embodied by a data memory section 13 of FIG. 2.

A terminal call origination section 75, when the terminal 1 needs to communicate maintenance information with the host 100, originates a call to the telephone number of the host stored in the host number memory section 76 so that the host recognizes a telephone number of the terminal 1. A ringing duration controlling section 71 is a block that controls a ringing duration of the call originated by the terminal call origination section 75.

These blocks of the ringing duration controlling section 71, the terminal line controlling section 72, the apparatus interface controlling section 73, the terminal maintenance information controlling section 74 and the terminal call origination section 75 are embodied through execution of the communication control program 12 by the terminal controlling section 10 of FIG. 2.

A host line controlling section 122 of FIG. 4 is a block that controls the host modem section 103 of FIG. 2 so that the host 100 communicates maintenance information with the terminal 1 via the dialup line 5. A telephone number recognizing section 123 is a block that, when a call arrives, recognizes and temporarily retains a telephone number of a station which has originated the call. A host call origination section 124 is a block that, after the call from the terminal 1 arrives and the call is halted after a predetermined time, originates a call in return to the telephone number of the terminal 1 recognized by the telephone number recognizing section 123 when the call from the terminal 1 arrives. A host maintenance information controlling section 125 is a block that controls exchange of maintenance information with the terminal 1.

Blocks 121, 126 and 127, shown by the dotted lines in FIG. 4, are not essential constituent elements of the present invention. The block 121 is a ringing duration measuring section 121 that measures the ringing duration when the call from the terminal 1 arrives. The ringing duration measuring section 121, when the terminal 1 varies the ringing duration according to importance of information, functions to judge importance of information which the terminal 1 requests the host to transmit.

The block 126 is a customer information memory section as a database that stores information of customers corresponding to maintenance information communication terminals. The block 127 is a historical information memory section as a database that stores maintenance histories of apparatuses corresponding to telephone numbers of the maintenance information communication terminals. The host maintenance information controlling section 125, when the call from the terminal 1 arrives, refers to the contents of the customer information memory section 126 and the contents of the historical information memory section 127 to control communication of maintenance information and thereby to ensure more appropriate exchange of the information with a customer corresponding to the terminal 1.

The ringing duration measuring section 121, the host line controlling section 122, the telephone number recognizing section 123, the host call origination section 124 and the host maintenance information controlling section 125 are the blocks to be embodied through execution of the communication control program 106 by the processing section 101 of FIG. 2. The customer information memory section 126 and the historical information memory section 127 are stored in the secondary memory section 102 of FIG. 2.

Next, there will be explained an operational procedure of the communication control program 12 of the terminal 1 and an operational procedure of the communication control program 106 of the host 100. These programs are shown in FIG. 2. FIG. 4 shows a diagram of blocks to be embodied through execution of the communication control program 12 and the communication control program 106.

Embodiment 1

Figure 1:
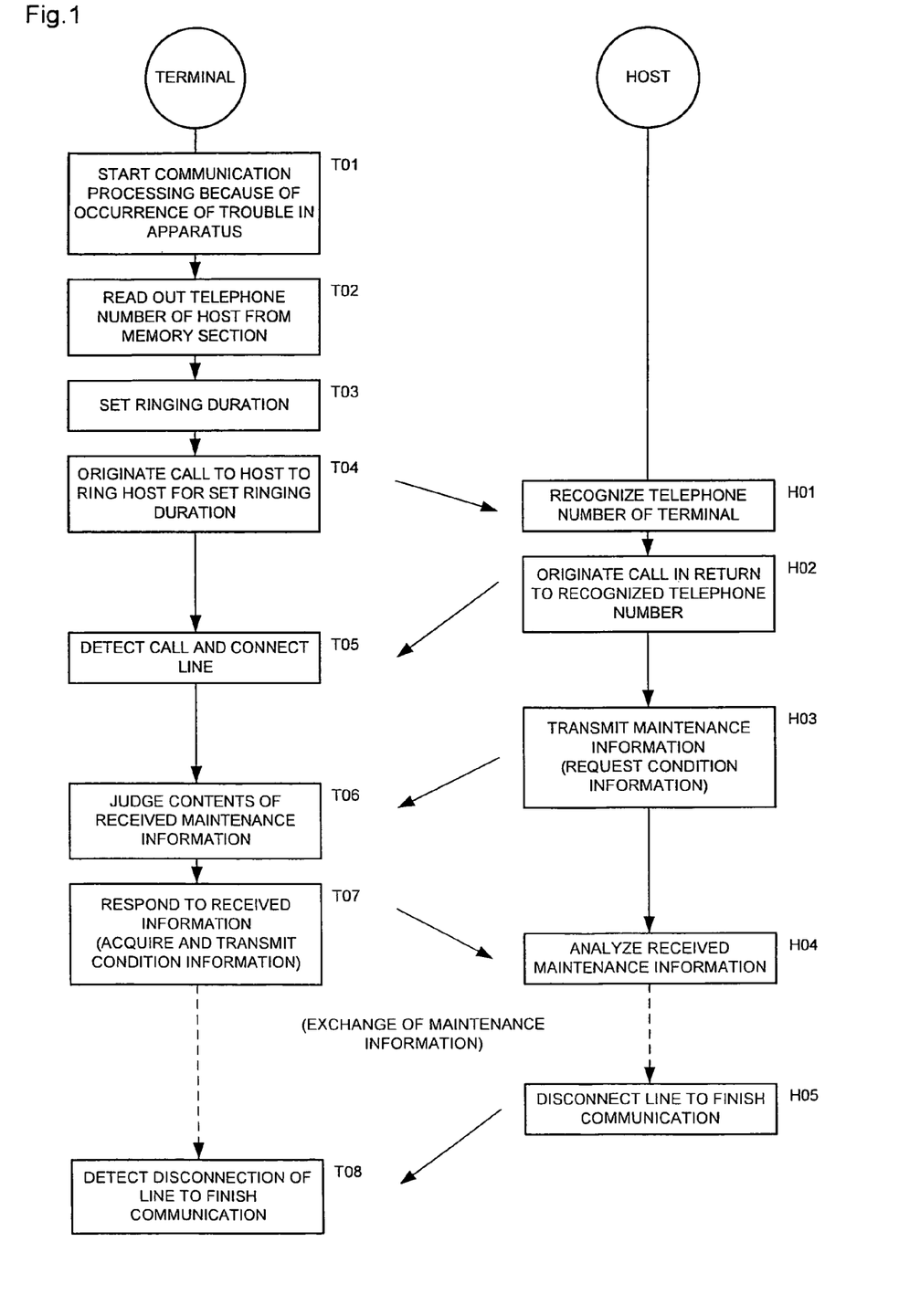
FIG. 1 is a flow chart showing an example of processing procedures according to the present invention which are respectively executed by a maintenance information communication terminal 1 and a maintenance information management host 100 connected together via a dialup line.

FIG. 1 is a flow chart showing an example of processing procedures according to the present invention which are respectively executed by the terminal 1 and the host 100 connected together via the dialup line 5. A symbol starting with an alphabet T is assigned to each step in the operational procedure in FIG. 1 executed on the terminal 1 side, while a symbol starting with an alphabet H is assigned to each step in the operational procedure executed on the host 100 side. In FIG. 1, all steps are shown in time sequence of from the top to the bottom.

When a trouble such as a failure of the finishing device occurs in the image forming apparatus 30, information on the trouble is transmitted via the apparatus interface controlling section 73 of FIG. 4 to the terminal maintenance information controlling section 74. The terminal maintenance information controlling section 74, when recognizing the trouble and judging that transmission of the information to the host 100 is required, determines communication processing to be started (at Step T01), and requests the terminal call origination section 75 to originate a call to the host. The terminal call origination section 75, as requested, reads out the stored telephone number of the host from the host number memory section 76 and requests the terminal line controlling section 72 to execute processing for originating a call (at Step T02). The terminal line controlling section 72, when receiving the request, sets a counter of the ringing duration controlling section 71 at a value for a predetermined ringing duration (at Step T03). Here, the ringing duration may be represented in terms of the number of rings but not in terms of time. In such a case, the ringing duration controlling section 71 is provided with a counter means, and the counter means is set at a predetermined value as the number of rings. The terminal line controlling section 72 originates a call to the host 100 to ring the host for the predetermined ringing duration (at Step T04).

The telephone number recognizing section 123 of the host 100, when the call from the terminal 1 arrives, recognizes the telephone number of the terminal 1 provided when the call from the terminal 1 arrives (at Step H01). The host maintenance information controlling section 125 controls a host line interface section 122 so that the line is not connected. Thus, no communication charge is made to the terminal 1 or to the host 100 for the call.

After the lapse of the predetermined ringing duration at which the counter of the ringing duration controlling section 71 has been set, the terminal line controlling section 72 halts the call. The host maintenance information controlling section 125, after the halt of the call, requests the host call origination section 124 to originate a call in return to the telephone number of the terminal 1 recognized by the telephone number recognizing section 123. The host call origination section 124, when receiving the request, requests the host line controlling section 122 to originates a call to the telephone number of the terminal 1. The host line controlling section 122, as requested, originates a call to the terminal 1 (at Step H02).

The terminal line controlling section 72 of the terminal 1, when the call from the host 100 arrives, connects the line (at Step T05). This brings the host 100 and the terminal 1 into communication with each other, and thus they can exchange maintenance information with each other. Since the call has been originated from the host 100, the charge for the call is made to the host 100.

After the connection of the line, the host maintenance information controlling section 125 starts a series of exchanges of maintenance information with the terminal 1. First, the host maintenance information controlling section 125 transmits a command requesting condition information on the terminal 1 (at Step H03). The terminal maintenance information controlling section 74, when receiving the command from the host 100, judges the contents of the command from the host 100 (at Step T06) and recognizes that condition information is requested. The terminal maintenance information controlling section 74, as requested, transmits a command providing condition information acquired from the image forming apparatus 30, to the host 100 (at Step T07).

The host maintenance information controlling section 125, when receiving the command from the terminal 1, judges the contents of the command from the terminal 1 (at Step H04), recognizes that the condition information has been transmitted from the terminal 1, analyzes the received condition information, and according to the analytical results, determines specifics of subsequent exchange. For example, the host maintenance information controlling section 125 determines to request more detailed information related to the received condition information, to instruct that self-diagnosis of the image forming apparatus 30 should be executed, or to change a set value. Or, if judging that the finishing device 34 is failed, the host maintenance information controlling section 125 stops the finishing device 34 and changes settings so that sheets are dropped only into an output tray on the main body side of the image forming apparatus 30 to avoid a problem that the whole image forming apparatus 30 is stopped. The host maintenance information controlling section 125, at the same time, causes the condition of the terminal 1 to be displayed in a display section 107 to inform an operator of the host 100, that is, an operator in a service center or the like, of the trouble in the image forming apparatus 30 and to urge the operator to take a measure. A message informing a measure determined to be taken on the service center side may be displayed in a display section of the image forming apparatus 30. For example, a message "A service engineer will immediately be dispatched. Please wait for a while." may be input from the input section 107 by the operator and the input message may be transmitted from the host 100 via the terminal 1 to the image forming apparatus 30 so as to be displayed in the operation section 65 of the image forming apparatus 30.

The host maintenance information controlling section 125, if judging that exchanges of maintenance information to be made have been fulfilled, requests the host line controlling section 122 to disconnect the line and thereby to finish the communication processing (at Step H05). The host line controlling section 122, as requested, disconnects the line. The terminal line controlling section 72 on the terminal side, when detecting the disconnection of the line, informs the terminal maintenance information controlling section 74 of it. The terminal maintenance information controlling section 74 finishes the communication processing (at Step T08).

Forms of commands or of parameters for use in exchange of maintenance information between the terminal 1 and the host 100 are defined in advance and embedded in the communication control program 12 of the terminal 1 or in the communication control program 106 of the host 100. The request for the condition information and the response to the request described above are examples of commands.

Embodiment 2

Figure 5:
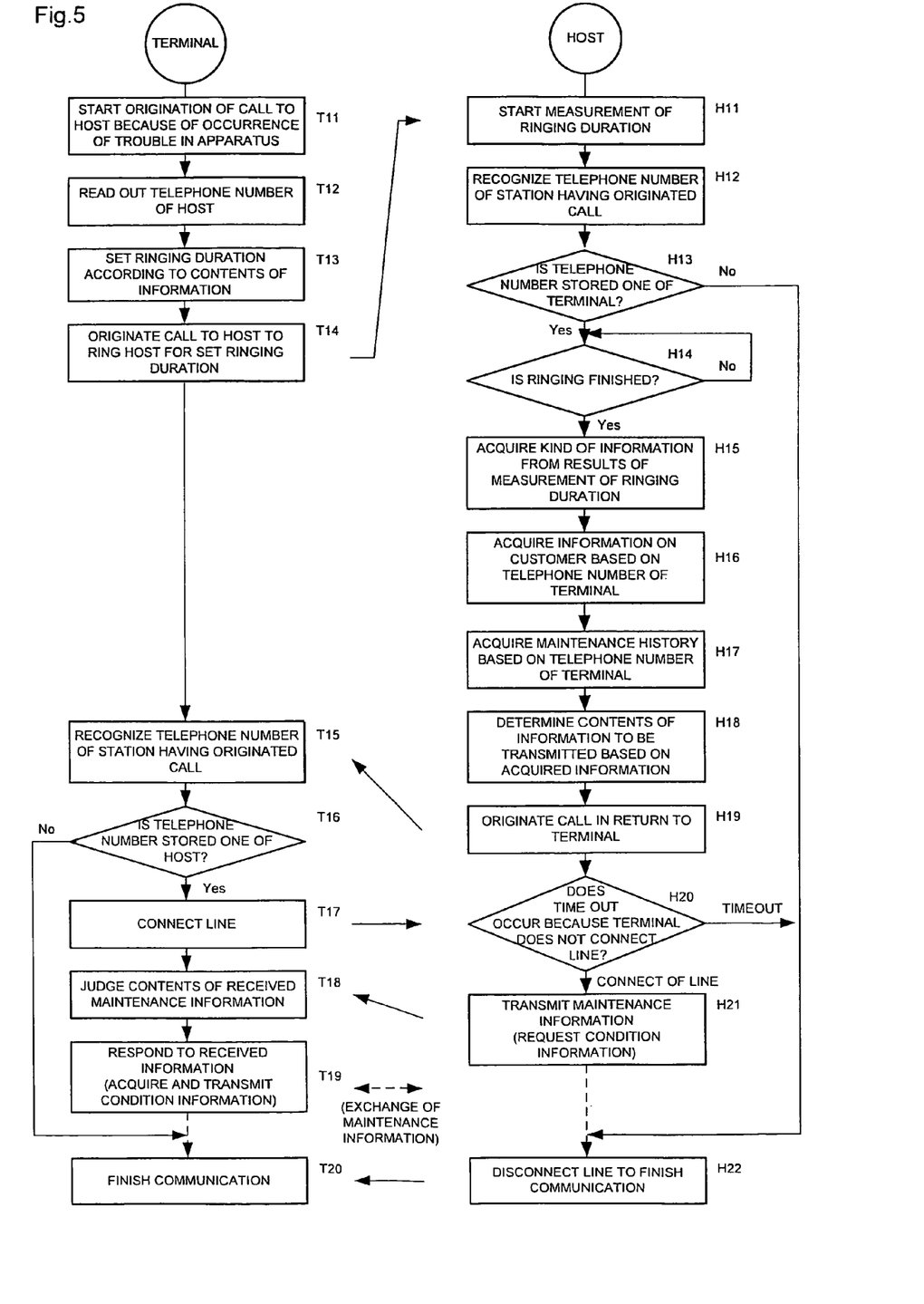
FIG. 5 is a flowchart showing another example of the processing procedures according to the present invention.

FIG. 5 is a flow chart showing another example of the processing procedures according to the present invention.

If a trouble occurs in the image forming apparatus 30, information on the trouble is transmitted via the apparatus interface controlling section 73 to the terminal maintenance information controlling section 74. The terminal maintenance information controlling section 74, if recognizing the trouble and judging that transmission of the information to the host 100 is required, determines communication processing to be started (at Step T11), and requests the terminal call origination section 75 to originate a call to the host. The terminal maintenance information controlling section 74 also judges importance of information to be transmitted and informs the terminal call origination section 75 of the importance. The terminal call origination section 75, as requested, reads out the stored telephone number of the host from the host number memory section 76 and requests the terminal line controlling section 72 to execute processing for originating a call according to the importance (at Step T12). The terminal line controlling section 72, when receiving the request, sets the timer of the ringing duration controlling section 71 at a value predetermined according to the importance to prepare for a call with the predetermined ringing duration (at Step T13). The terminal line controlling section 72 originates a call to the host 100 to ring the host for the predetermined ringing duration (at Step T14). After the lapse of the ringing duration at which the timer of the ringing duration controlling section 71 has been set, the terminal line controlling section 72 halts the call.

The ringing duration measuring section 121 of the host 100, when the call from the terminal 1 arrives, starts measurement of the ringing duration (at Step H11). The telephone number recognizing section 123 recognizes the number of the terminal 1 provided when the call arrives (at Step H12) and judges whether or not the recognized telephone number is identical to any one of the telephone numbers of the terminals stored in advance (at Step H13). If the recognized telephone number is not identical to any one of the stored telephone numbers of the terminals, the telephone number recognizing section 123 judges that the call is a wrong call and the routine proceeds to Step H22 and thus the communication processing is finished. If the recognized telephone number is identical to one of the stored telephone numbers of the terminals, on the other hand, the ringing duration measuring section 121 measures the time to the end of ringing (at Step H14) and, at the end of ringing, determines kind of the information. The host maintenance information controlling section 125 controls the host line interface section 122 so that the line is not connected. Thus, no communication charge is made to the terminal 1 or to the host 100 for the call.

The host maintenance information controlling section 125, after the halt of the call, acquires the kind of the information from the ringing duration measuring section 121 (at Step H15). The host maintenance information controlling section 125 retrieves information on the customer corresponding to the terminal 1 from the customer information memory section 126 based on the telephone number of the terminal 1 recognized by the telephone number recognizing section 123, and acquires the information on the customer (at Step H16). In the customer information memory section 126, information on customers such as a copy center are stored in advance as information on customers whose urgency level is higher than other customers. The host maintenance information controlling section 125 judges that, for a call from an apparatus corresponding to one of the customers whose urgency level is high, dispatch of a service engineer is in urgent need. Also, the host maintenance information controlling section 125 retrieves, from a history memory section 127, based on the recognized telephone number, a maintenance history of the apparatus corresponding to the telephone number, and thus acquires the maintenance history (at Step H17). Each maintenance history includes information on, for example, counter values in an apparatus, conditions of consumables and the like immediately before the arrival of a call. Accordingly, the host maintenance information controlling section 125 needs to request not all information on the condition of an apparatus but only information not included in a maintenance history.

The host maintenance information controlling section 125 determines the contents of information to be transmitted to the terminal 1 based on the kind of the information, on the information on the customer and on the maintenance history, which have been acquired above, and determines commands to be used according to the determination (at Step H18).

After the determination of the contents of information to be transmitted to the terminal, the host maintenance information controlling section 125 requests the host call origination section 124 to originate a call in return to the telephone number of the terminal 1 recognized by the telephone number recognizing section 123. The host call origination section 124, when receiving the request, requests the host line controlling section 122 to originate a call to the telephone number recognized by the telephone number recognizing section 123. The host line controlling section 122, as requested, originate a call to the terminal 1 (at Step H19).

The terminal line controlling section 72 of the terminal 1, when the call from the host 100 arrives, recognized the telephone number of the terminal 1 (at Step T15), and judges whether or not the recognized telephone number is identical to any one of the telephone numbers stored in the host number memory section 76 (at Step T16). If the recognized telephone number is not identical to any one of the stored telephone numbers, the terminal line controlling section 72 judges that the call is a wrong call and the routine proceeds to Step H20 and thus the communication processing is finished. The host line controlling section 122, when the terminal 1 does not connect the line within the predetermined time, judges that a timeout occurs (at Step H20), and the routine proceeds to Step H22 and thus the communication is finished. If the recognized telephone number is identical to one of the telephone numbers stored by the host number memory section 76, on the other hand, the terminal line controlling section 72 connects the line (at Step T17). This brings the host 100 and the terminal 1 into communication with each other, and thus they can exchange maintenance information with each other. Since the call is originated from the host 100, a charge for the call is made to the host 100.

After the connection of the line, the host maintenance information controlling section 125 starts a series of exchanges of maintenance information determined based on the kind of the information, on the information on the customer and on the maintenance history, which have been acquired above (at Step H21). The terminal maintenance information controlling section 74, when receiving information from the host 100, judges the contents of the received information received from the host 100 (at Step T18) and transmits information in response to the contents of the received information (at Step T19).

The host maintenance information controlling section 125, when receiving the information from the terminal 1, judges the contents of the information received from the terminal 1 and, if necessary, makes further exchange of maintenance information with the terminal 1.

The host maintenance information controlling section 125, when judging that exchanges of maintenance information to be made have been fulfilled, requests the host line controlling section 122 to disconnect the line and thus to finish the communication processing (at Step H22). The host line controlling section 122, as requested, disconnects the line. The terminal line controlling section 72 on the terminal side, when detecting the disconnection of the line, informs the terminal maintenance information controlling section 74 of it. The terminal maintenance information controlling section 74 finishes the communication processing (at Step T20).

What is claimed is:

1. A maintenance information communication terminal, the terminal exchanging maintenance information on an apparatus to be maintained with a maintenance information management host, the terminal and the host being connectable together by a line, the apparatus connected to the terminal, the terminal comprising:

a host number memory section that stores a telephone number of the host;

a terminal call origination section that originates a call to the host of the stored telephone number so that the host recognizes a telephone number of the terminal; and a ringing duration controlling section that controls a ringing duration of the call so as to halt the call before the host connects the line and thereby to request the host to start communication, wherein the ringing duration is controlled based on a kind of maintenance information to be transmitted to the host.

2. The terminal of claim 1, wherein the ringing duration is represented in terms of time and controlled based on the kind of maintenance information to be transmitted to the host.

3. The terminal of claim 1, wherein the ringing duration is represented in terms of the number of rings and controlled based on the kind of maintenance information to be transmitted to the host.

4. The terminal of claim 1, further comprising a terminal line controlling section that, when a call arrives at the terminal, judges whether or not a telephone number of a station which has originated the call is that of the host and, if the telephone number of the station is that of the host, connects the line.

5. An image forming apparatus, comprising:
a maintenance information communication terminal exchanging maintenance information on an apparatus to be maintained with a maintenance information management host, the terminal and the host being connectable together by a line, the apparatus connected to the terminal, the terminal comprising:

a host number memory section that stores a telephone number of the host;

a terminal call origination section that originates a call to the host of the stored telephone number so that the host recognizes a telephone number of the terminal; and a ringing duration controlling section that controls a ringing duration of the call so as to halt the call before the host connects the line and thereby to request the host to start communication, wherein the ringing duration is controlled based on a kind of maintenance information to be transmitted to the host.

* * * * *